(12) United States Patent
Pastore

(10) Patent No.: US 6,220,717 B1
(45) Date of Patent: Apr. 24, 2001

(54) MIRROR FOR USE WITH ELEVATED HUNTER STAND

(76) Inventor: Anthony Pastore, 10523 Horizons Dr., Spring Hill, FL (US) 34608

( * ) Notice: Subject to any disclaimer, the term of this patent is extended or adjusted under 35 U.S.C. 154(b) by 0 days.

(21) Appl. No.: 09/588,241

(22) Filed: Jun. 6, 2000

(51) Int. Cl.[7] .................................................. G02B 7/182
(52) U.S. Cl. .......................... 359/871; 359/881; 359/882; 248/466
(58) Field of Search ..................................... 359/871, 872, 359/881, 882, 875, 840; 248/466, 467, 468, 476

(56) References Cited

U.S. PATENT DOCUMENTS

| | | |
|---|---|---|
| 5,096,283 | 3/1992 | Croteau . |
| 5,106,177 | 4/1992 | Dolasia . |
| 5,313,337 | 5/1994 | Byers . |
| 5,383,061 | 1/1995 | Lanier . |
| 5,604,633 * | 2/1997 | Christianson .................... 359/507 |
| 5,784,213 | 7/1998 | Howard . |
| 5,825,564 | 10/1998 | Mazarac . |
| 6,039,455 * | 3/2000 | Sorenson ................................. 362/142 |

* cited by examiner

*Primary Examiner*—Cassandra Spyrou
*Assistant Examiner*—Marj A. Robinson
(74) *Attorney, Agent, or Firm*—Larson & Larson, P.A.; James E. Larson

(57) ABSTRACT

A rear view mirror device for use with an elevated hunter platform is disclosed. The device includes a frame member retaining a mirror element on a front side. A back side of the frame member includes a rod receiving portion for receiving and retaining a top end of a flexible rod. A bottom end of the flexible rod attaches by a screw and wing nut to a center portion of a clamp. The clamp includes a pair of handles and a pair of fingers which are actuated by a spring disposed within the clamp center portion. To deploy the device, pressure is applied to the handles which opens the fingers. The device is then located to its desired position on the elevated hunter platform whereafter the pressure on the handles is released causing the fingers to engage a rail of the platform. The mirror element can then be positioned by rotating the device about a plurality of axises such that the hunter does not have to turn his head to see the area behind or to the side of his forward facing view.

20 Claims, 4 Drawing Sheets

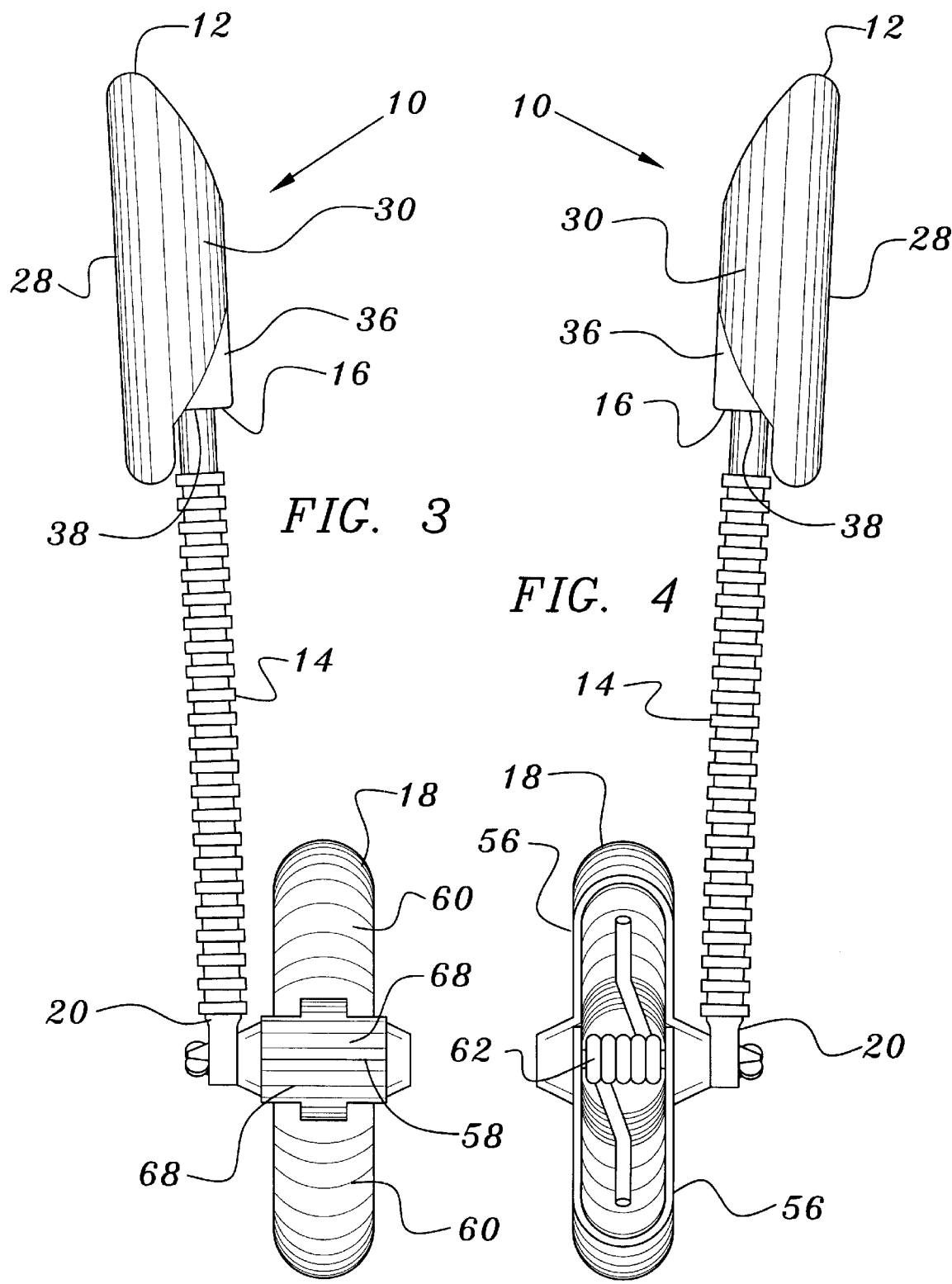

MIRROR FOR USE WITH ELEVATED HUNTER STAND

BACKGROUND OF THE INVENTION

1. Field of the Invention

This invention relates to a rear view mirror. More particularly, it relates to a rear view mirror used with an elevated hunter stand, such as one attached to a tree.

2. Description of Prior Art

Rear view mirrors are well known in the prior art. Most people would initially think of the rear view mirror which is mounted in their passenger car. The use of such a mirror is critical to driving. To avoid turning completely around, a driver simply glances at the rear view mirror to see if any cars or other objects are behind the vehicle they are driving. These types of mirrors are typically glued to the front windshield.

Mirrors of course have many other uses, having been used in households for centuries. It would be quite uncommon not to find a least one mirror in any given home, residence or even a business. People use household mirrors to check the nature of their appearance as well as to add aesthetic beauty to their surroundings (i.e., providing more depth to a small size room).

However, the use of mirrors in sports, and in particular, outdoor hobbies, is quite uncommon. There are very few sports or hobbies that require the use of mirrors to play the certain sport. One sport that has essentially not seen the use of mirrors is hunting. Hunters generally establish a fixed position or "creep" through wooded areas in an attempt to locate prey. The sport of hunting requires acute senses, such as good hearing and keen eyesight. Upon locating their prey, by means of sound or eyesight, a hunter raises his weapon and "takes" a shot at the prey. Although the sense of sound may be used in initially locating prey, it is acute eyesight that is required to effectively find prey. In this regard, a hunter wishes to scan as much territory as possible to locate his prey.

Since most hunted animals, such as a deer, possess their own acute sense of hearing, hunters today have become more dependent on elevated stands which position the hunter above the ground surface whereby he waits for the prey to cross his path. This eliminates, or at least lowers, the possibility of the hunter making a noise which may alert the potential target animal of the possibility of a hunter being in close proximity. Placing the hunter in an elevated position can be accomplished by using a tower device or what is commonly known as a tree stand. Tree stands attach to the trunk of a tree and can be left in the tree indefinitely so that the hunter can return to the elevated tree stand each day or night during his hunting expedition.

Elevated tree stands come in many forms. Some are constructed such that the hunter places his back against the tree trunk, while others position the hunter with his back away from the tree trunk such that he faces the tree. In either configuration, the hunter has a limited view due to the fact that he is facing a single direction. Since most tree stands are quite constricting, it is often difficult for the hunter to swivel and view the surrounding area behind him. Further, any swiveling movement can cause noise and "spook" an approaching animal. In this regard, it would be advantageous to have a device or an improved tree stand which permits the hunter to view the surroundings behind him, regardless of the way he is facing. This improvement would increase the area that a hunter can scan in hopes of locating a prey in which he can attempt a shot.

Some attempts have been made to further improve rear viewing capabilities in hunter tree stands. For instance, U.S. Pat. No. 5,383,061 to Lanier depicts a device which resembles an automobile rear view mirror. The device has a mirror and an arm portion on which a spike is mounted. The spike is driven into a tree trunk to mount the device. This type of device is specifically used for hunter tree stands in which the hunter faces the tree. Accordingly, this type of mirror device is extremely limited. Lanier lacks any mention or teaching of a mirror device which could be used with any other elevated hunter stand except that of a trunk facing stand. Further, the Lanier device requires the insertion of the spike into the tree trunk which, over time, is damaging to the tree. Further, the view that is provided by the Lanier device is extremely limited due to its position in the tree. The device lacks an ability to employ the mirror in multiple positions. Further improvements on a rear view mirror for use with elevated hunter stands is needed. Such improved device should overcome the deficiencies seen in the prior art.

SUMMARY OF THE INVENTION

I have invented an improved rear viewing mirror device for use with elevated hunter stands which overcomes all of the deficiencies seen in the prior art. In its preferred form, my device is used with elevated hunter tree stands that attach directly to the tree trunk. However, my device is not limited in its use and can be effectively used with other elevated hunter stands, such as tower devices.

My device includes a mirror portion having a flexible rod extending from a bottom end thereof. The flexible rod permits the mirror to be employed in a variety of positions rotating about three separate axises. A clamping mechanism is provided at an opposed end from the mirror portion on the flexible rod. The clamping mechanism permits the device to be attached to any portion of an elevated hunter stand. This effectively permits the hunter to view all areas behind and to the side of his forward visual plane. By simple rotating the mirror about any of the three axises, the hunter can scan all areas around him without moving his head. This eliminates all unnecessary movement which may spook an approaching target animal.

BRIEF DESCRIPTION OF THE DRAWINGS

The invention may be best understood by those having ordinary skill in the art by reference to the following detailed description when considered in conjunction with the accompanying drawings in which:

FIG. 3 is a right side elevational view thereof;

FIG. 4 is a left side elevational view thereof; and

DETAILED DESCRIPTION OF THE INVENTION

Figure 1:
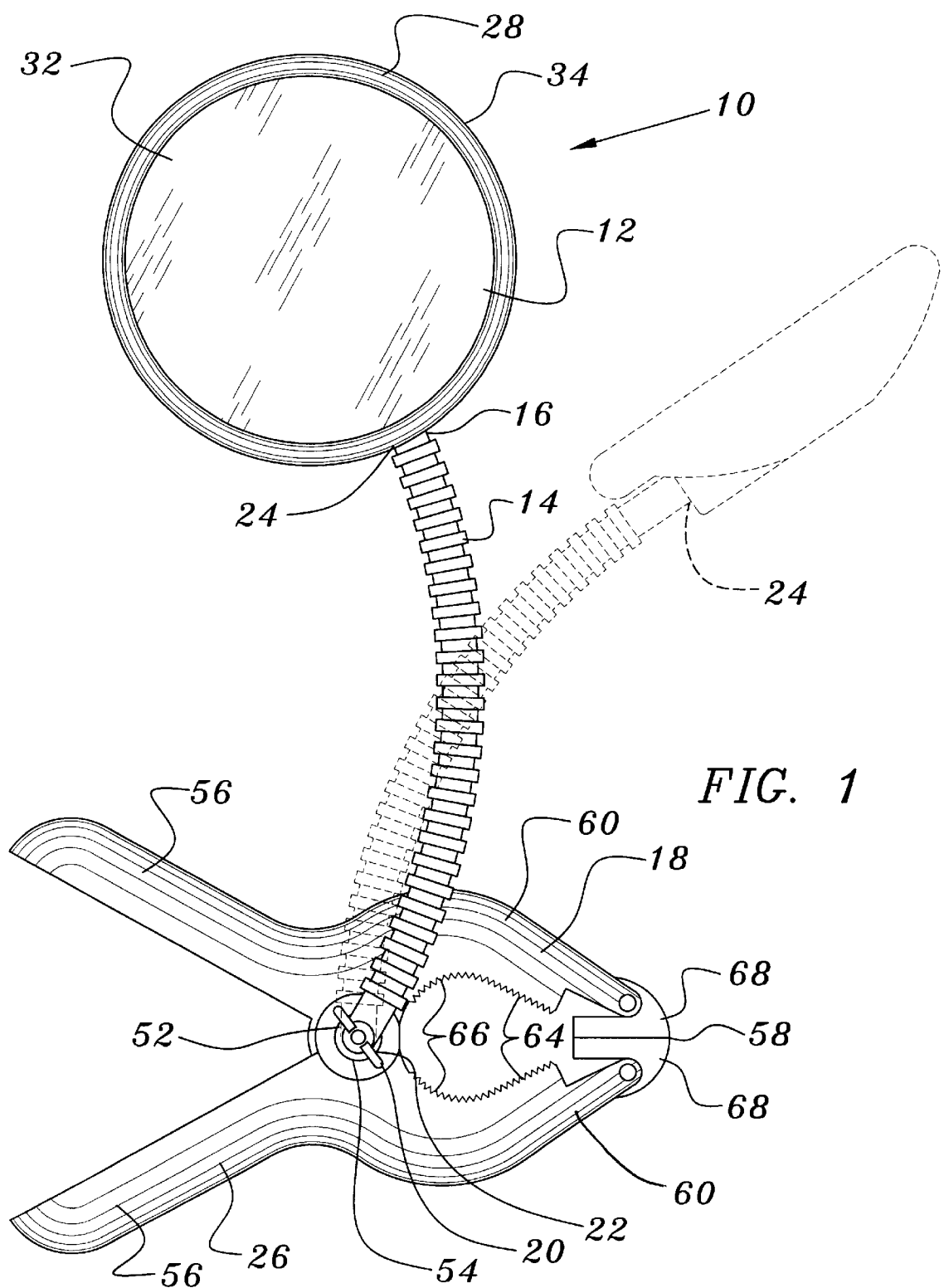
FIG. 1 is a front elevational view of the novel elevated hunter stand rear view mirror device of the present invention depicting how the mirror rotates about its axises.

Throughout the following detailed description, the same reference numerals refer to the same elements in all figures.

Referring to FIG. 1, a hunter tree stand rear view mirror device 10 is shown. Mirror device 10 includes a mirror 12 mounted on a flexible rod member 14 at a top end 16 of rod 14. A clamping mechanism 18 mounts to a bottom end 20 of rod 14. Flexible rod 14 permits mirror 12 to be deployed in a variety of positions since rod 14 can move about at least three axises. In particular, rod 14 can rotate about a first pivot point 22 located at rod bottom end 20. Further, mirror 12 can rotate about a second pivot point 24 at rod top end 16. And finally, although not illustrated in FIG. 1, mirror 12 can pivot forwards and backwards in relation to a front side surface 26 of clamping mechanism 18. Since rod 14 is flexible and can be effectively bent along any portion of its length, mirror 12 can be positioned in a plurality of additional positions by merely applying force to the desired point along the rod length.

Figure 2:
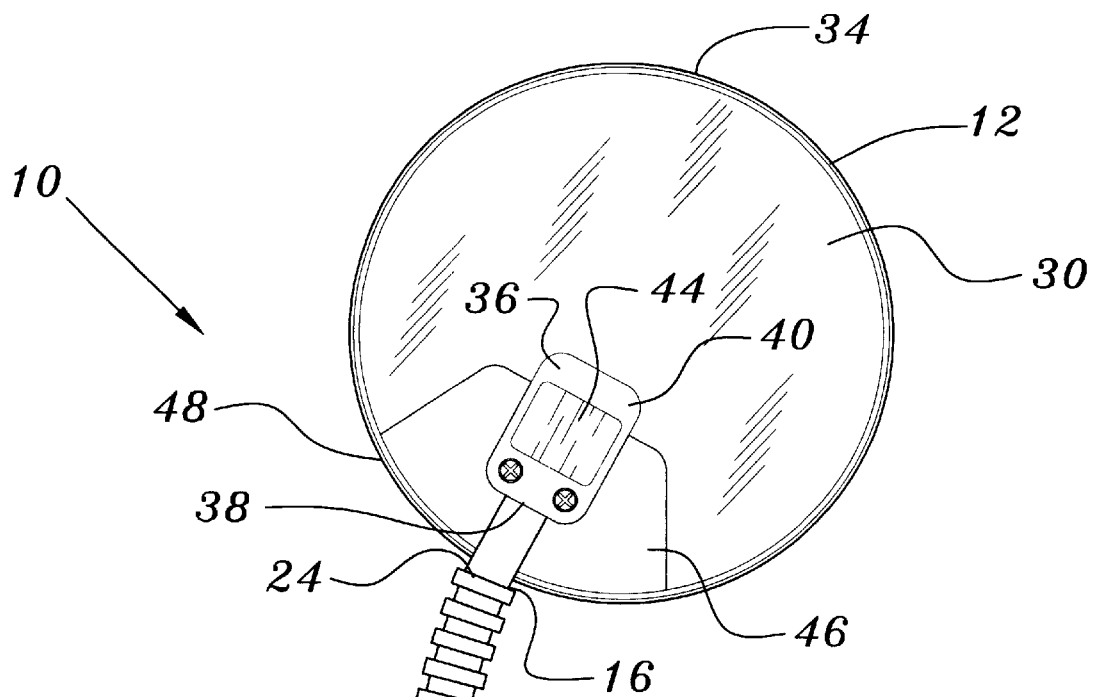
FIG. 2 is a rear elevational view thereof.

Referring to FIGS. 1 and 2, mirror 12 includes a front and back side, 28 and 30 respectively. Mirror front side 28 contains a mirror element 32 mounted within a circular frame 34. Mirror back side 30 contains a receiving member 36 for attaching rod top end 16 to mirror 12. Receiving member 36 includes a channel 38 which permits rod top end 16 to lay therewithin. A top plate member 40 encloses rod top end 16 within channel 36 and a pair of screws 42 clamp top plate member 40 down against mirror back side 30. A small reflective element 44 can also be applied along mirror back side 30 (as shown in FIG. 2), for permitting a hunter to locate his mirror device 10, and thereby his elevated hunter stand, in total darkness by simply shining a flashlight beam towards device 10.

In the preferred embodiment, mirror back side 30 is convexed shaped as shown in FIGS. 3 and 4. Also to the preferred embodiment, top plate member 40 is integral with mirror back side 30, although an alternate embodiment (not shown) could employ a removable top plate member 40. As shown in FIG. 2, a small indent 46 is formed along a bottom side 48 of mirror back side 30. This permits rod 14 to insert directly into channel 38 (see also FIGS. 3 and 4).

As shown in FIGS. 1 and 2, rod bottom end 20 attaches to clamping mechanism 18 by a screw 50 (FIG. 2) and wing nut 52 (FIG. 1). Screw 50 inserts through a center rotation point 54 of clamping mechanism 18. Clamping mechanism 18 further includes a pair of handles 56 which, when forced towards one another by the pressure of a human hand, open a clamping point 58 of a pair of fingers 60 located at an end opposed from that of handles 56. A spring 62 (see FIG. 4) operates to hold fingers 60, and therefore clamping point 58, in a locked position when no pressure is applied to handles 56.

Figure 5:
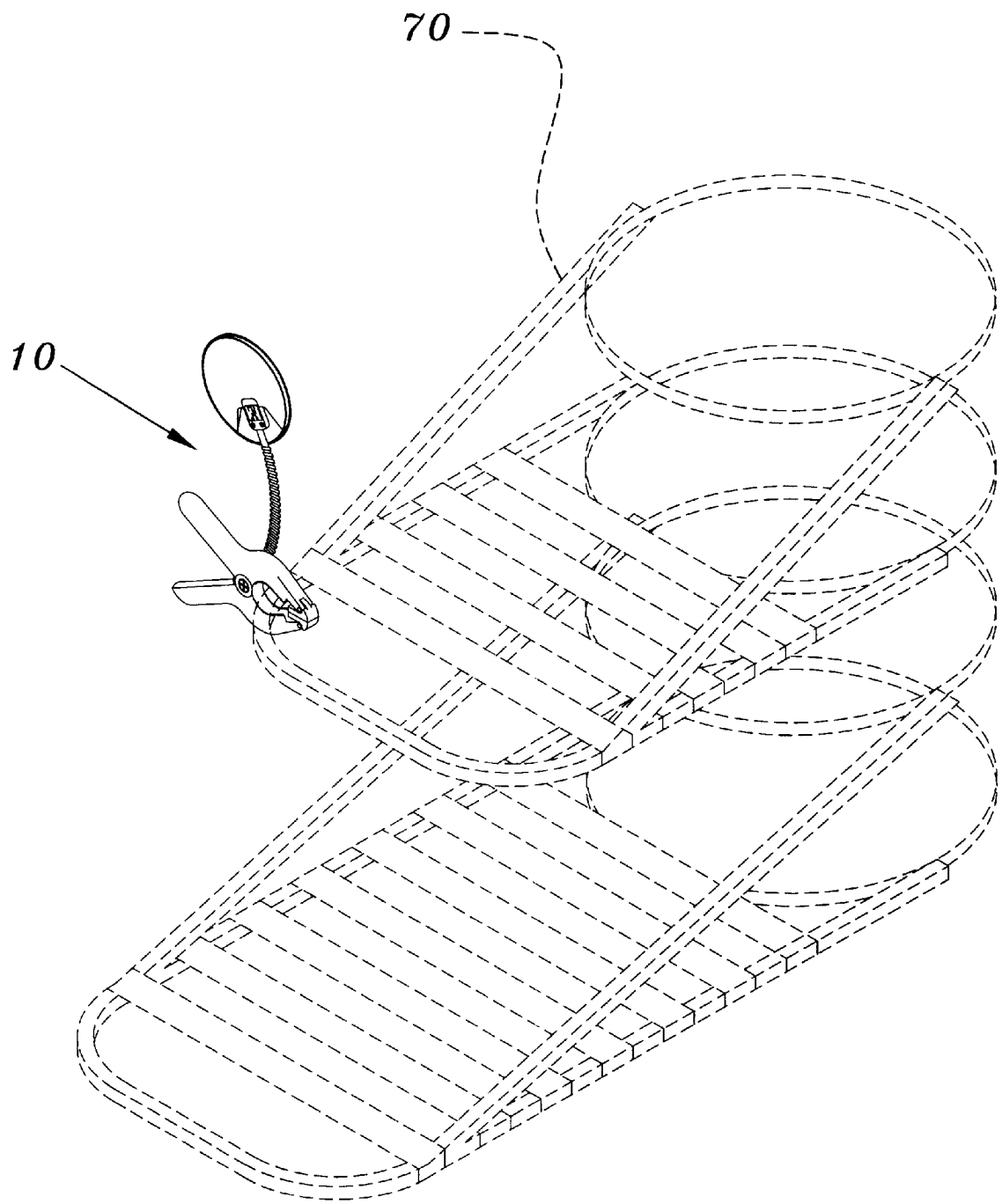
FIG. 5 is a perspective view of a hunter tree stand illustrating how the rear view mirror device clamps thereto.

Further to FIGS. 1 and 2, it is shown that clamping mechanism 18 can also include a set of serrations 64 disposed along inner edges 66 of fingers 60. Serrations 62 assist fingers 60 in clamping down against a surface in which mirror device 10 is employed (as shown in FIG. 5, for instance). Still further, fingers 60 include a pair of rotatable tip portions 68 located at clamping point 58. Rotatable tip portions 68 further assist mirror device 10 in clamping to a surface to which mirror device 10 is to be employed.

To deploy mirror device 10, pressure is applied to handles 56 which opens clamping point 58 of fingers 60. Fingers 60 pivot about clamping mechanism rotation point 54. Upon locating the desired position on which a user wishes to deploy mirror device 10, pressure is released from handles 56, where spring 62 forces clamping point 58 to close and accordingly clamp mirror device 10 to the desired location. Once mirror device 10 is deployed, mirror 12 can be positioned at the desired angle such that the user can then comfortably sit or stand within his elevated platform and wait for approaching prey from both a face forward perspective as well as a rear perspective through the use of mirror device 10.

As shown in FIG. 5, the preferred employment of mirror device 10 is used in combination with an elevated hunter tree stand 70 that is mounted directly to a tree trunk. However, mirror device 10 could be used with an elevated tower or elevated leaning ladder style tree platform, neither of which are depicted herein.

Equivalent elements can be substituted for the ones set forth above such that they perform the same function in the same way for achieving the same result.

Having thus described the invention what is claimed and desired to be secured by Letters Patent is:

1. A rear viewing mirror device for use in combination with an elevated hunter platform of the type that positions a hunter above a ground surface, the elevated hunter platform including at least one side rail, the rear viewing mirror device comprising:

a) a frame member having a front and back side, the front side receiving and retaining a mirror element, the back side having a rod receiving portion, the rod receiving portion having a channel enclosed within top and bottom plates, the channel having an open end, b) a flexible rod member having a top and bottom end, the top end inserted within the rod receiving portion channel open end, the rod receiving portion top and bottom plates applying force in a direction towards one another thereby retaining the flexible rod member top end within the channel, c) a clamping mechanism including a pair of handles and pair of finger elements, the finger elements having a clamping point which is operable by a spring inserted within a center portion of the clamping mechanism, the spring actuated by force applied to the pair of the handles, the clamping mechanism further including a center channel formed through the center portion for receiving a screw, the screw receiving a nut at a distal end for attaching the flexible rod bottom end to the clamping mechanism, and d) the rear viewing mirror device fingers attached to the elevated hunter platform at least one side rail.

2. The rear viewing mirror device of claim 1, wherein the frame member is circular.

3. The rear viewing mirror device of claim 1, wherein the frame member back side is convexed shaped.

4. The rear viewing mirror device of claim 1, wherein the rod receiving portion top and bottom plates are integral with the frame member back side.

5. The rear viewing mirror of claim 4, wherein the rod receiving portion top and bottom plates are held together by a pair of screws.

6. The rear viewing mirror device of claim 1, wherein the frame member rotates about a plurality of pivot points.

7. The rear viewing mirror device of claim 1, wherein the clamping mechanism further includes a pair of rotatable tip portions, one each mounted on each finger element.

8. The rear viewing mirror device of claim 1, wherein the clamping mechanism further includes a set of serration elements disposed along inner edges of each finger element.

9. The rear viewing mirror device of claim 1, further comprising a reflective element mounted along the frame member back side.

10. The rear viewing mirror device of claim 1, further comprising an indent formed along a bottom portion of the frame member back side, the indent having a top surface, the rod receiving portion bottom plate mounted on the indent top surface.

11. A rear viewing mirror device for use in combination with an elevated hunter platform of the type that positions a hunter above a ground surface in a tree, the elevated hunter platform including at least one side rail, the rear viewing mirror device comprising:

a) a circular frame member having a front and back side, the front side receiving and retaining a mirror element, the back side having a convex shape and a rod receiving portion mounted thereupon, the rod receiving portion having a channel enclosed within top and bottom plates, the channel having an open end, b) a flexible rod member having a top and bottom end, the top end inserted within the rod receiving portion channel open end, the rod receiving portion top and bottom plates applying force in a direction towards one another thereby retaining the flexible rod member top end within the channel, the flexible rod member permitting the circular frame member to rotate about a plurality of pivot points, c) a clamping mechanism including a pair of handles and pair of finger elements, the finger elements having a clamping point which is operable by a spring inserted within a center portion of the clamping mechanism, the spring actuated by force applied to the pair of the handles, the clamping mechanism further including a center channel formed through the center portion for receiving a screw, the screw receiving a nut at a distal end for attaching the flexible rod bottom end to the clamping mechanism, and d) the rear viewing mirror device fingers attached to the elevated hunter platform at least one side rail.

12. The rear viewing mirror device of claim 11, wherein the rod receiving portion top and bottom plates are integral with the frame member back side and held together by a pair of screws.

13. The rear viewing mirror device of claim 11, wherein the circular frame member rotates about three separate axes.

14. The rear viewing mirror device of claim 13, wherein the circular frame member rotates in a circular direction at a first axis located at the flexible rod member top end, side to side at a second axis located at the flexible rod member bottom end and front to back at a third axis located at the flexible rod member bottom end.

15. The rear viewing mirror device of claim 11, wherein the clamping mechanism further includes a pair of rotatable tip portions, one each mounted on an end of each finger element, and a set of serration elements disposed along inner edges of each finger element.

16. The rear viewing mirror device of claim 11, further comprising:

a) an indent formed along a bottom portion of the circular frame member back side, the indent having a top surface, the rod receiving portion bottom plate mounted on the indent top surface; and b) a reflective element mounted along the circular frame member back side.

17. A rear viewing mirror device for use in combination with an elevated hunter platform of the type that positions a hunter above a ground surface in a tree, the elevated hunter platform attached directly to the tree trunk and having a plurality side rails, the rear viewing mirror device comprising:

a) a circular frame member having a front and back side, the front side receiving and retaining a mirror element, the back side having a convex shape and a rod receiving portion mounted thereupon, the rod receiving portion having a channel enclosed within integral top and bottom plates, the channel having an open end, b) a flexible rod member having a top and bottom end, the top end inserted within the rod receiving portion channel open end, the rod receiving portion integral top and bottom plates applying force in a direction towards one another thereby retaining the flexible rod member top end within the channel, the integral top and bottom plates held together by a pair of screws, the flexible rod member permitting the circular frame member to rotate about a plurality of pivot points, c) a clamping mechanism including a pair of handles and pair of finger elements, the finger elements having a clamping point which is operable by a spring inserted within a center portion of the clamping mechanism, the spring actuated by force applied to the pair of the handles, the clamping mechanism further including a center channel formed through the center portion for receiving a screw, the screw receiving a nut at a distal end for attaching the flexible rod bottom end to the clamping mechanism, and d) the rear viewing mirror device fingers attached to one of the elevated hunter platform plurality of side rails.

18. The rear viewing mirror device of claim 17, wherein the clamping mechanism further includes a pair of rotatable tip portions, one each mounted on each finger element, and a set of serration elements disposed along inner edges of each finger element.

19. The rear viewing mirror device of claim 17, further comprising:

a) an indent formed along a bottom portion of the circular frame member back side, the indent having a top surface, the rod receiving portion integral bottom plate mounted on the indent top surface; and b) a reflective element mounted along the rod receiving portion integral top plate.

20. The rear viewing mirror device of claim 17, wherein the circular frame member rotates in a circular direction at a first axis located at the flexible rod member top end, side to side at a second axis located at the flexible rod member bottom end and front to back at a third axis located at the flexible rod member bottom end.

* * * * *